United States Patent
Iijima et al.

(10) Patent No.: US 6,561,638 B1
(45) Date of Patent: May 13, 2003

(54) INK-JET RECORDING METHOD AND RECORDED MATTER

(75) Inventors: Hirotaka Iijima, Hachioji (JP); Naoki Sato, Hachioji (JP); Kenzo Kasahara, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/146,858

(22) Filed: May 15, 2002

(30) Foreign Application Priority Data

May 18, 2001 (JP) ........................................ 2001-149051

(51) Int. Cl.$^7$ ............................. G01D 11/00; B41J 2/01; B32B 27/14; B32B 3/00

(52) U.S. Cl. ..................... 347/100; 347/105; 428/195

(58) Field of Search ................................ 347/101, 100, 347/105, 106; 428/195

(56) References Cited

U.S. PATENT DOCUMENTS 6,436,515 B1 * 8/2002 Ohbayhashi et al. ........ 428/195

* cited by examiner

*Primary Examiner*—John Barlow
*Assistant Examiner*—Michael S. Brooke
(74) *Attorney, Agent, or Firm*—Squire, Sanders & Dempsey, L.L.P.

(57) ABSTRACT

An ink-jet recording method comprising the step of adhering a dispersion ink comprised of a colorant dispersed in a solvent onto recording medium having a fine particle and a water-soluble binder, wherein the relation the center-line average surface roughness RaA in μm at the non-image area of the recording medium and the center-line average surface roughness RaB in μm at the image area of the recording medium is represented by Expression 1 is described.

$0.7 \leq RaB/RaA \leq 1.8$           Expression 1.

According to the above, an ink-jet recording method and a recording matter excellent in the glossiness feel, smoothness feel and texture can be provided.

14 Claims, No Drawings

INK-JET RECORDING METHOD AND RECORDED MATTER

FIELD OF THE INVENTION

The invention relates to an ink-jet recording method to be used for an ink-jet image formation and a recorded matter by the recording method.

BACKGROUND OF THE INVENTION

Recently, a hard copy image recording technology for recording an image created by a digital camera or a computer is rapidly progressed accompanied with such the instruments. One of the objects of the hard copy is to obtain an image near a silver salt photograph. Particularly, the object of the development is to bring the color reproducibility, color density, texture, resolving power, glossiness and light resistively near those of the silver salt photograph.

Various recording methods such as a sublimation thermal transfer method, an ink-jet method and a static recording method have been proposed or practically used as the hard copy recording method other than a method in which an image displayed on a display device is directly photographed by a silver slat photography. Among these methods, a printer using the ink-jet method is rapidly spread recently since the method has advantages such that the method is easily utilized for full color image recording and the noise accompanied with the printing action is small.

The ink-jet recording method is rapidly progressed since an accurate image can be recorded by a relatively simple apparatus. Such the method is widely applied for various uses and recording media and inks suitable for each of the uses are used.

The recording media to be used in the ink-jet recording include one such as plain paper in which the ink receiving layer is the support paper itself, one such as coated paper comprising an ink absorbable support and an ink absorbing layer coated on the support and one comprising an ink non-absorbable support such as a resin coated paper or a polyester film and an ink absorbing layer coated thereon. Among them, the recording medium comprising an ink non-absorbable support and an ink absorbing layer coated thereon is preferably used for an output requiring a high class texture as silver salt photograph with a glossiness feel, luster and depth since such the media has a high smoothness of the surface and a low undulation. A swelling type recording medium comprising the ink non-absorbable support and a water-soluble binder such as poly(vinylpyrrolidone) and poly(vinyl alcohol) as the ink absorbing layer coated on the support, and a porous type recording medium having a ink absorbing layer constituted by a pigment or a combination of a pigment and a binder so as to form fine pores for absorbing the ink are used as the recording medium with high glossiness and luster.

Besides, the ink is broadly classified into a dye ink in which a colorant is dissolved in a solvent and a dispersion ink in which a colorant is dispersed in a solvent. The dye ink is preferably used for output of an image of silver salt photograph since such the ink has a well color appearance and a high chromaticness. The dye ink, however, basically tends to be discolored by light. Therefore, such the ink causes a problem that the image is rapidly discolored when the image is posted up for a long period unless a laminate treatment is applied on the surface thereof. Besides the dispersion ink is difficultly discolored in general and preferably used for drawing up a matter to be posted up such as a poster. The dispersion ink is not suitable for printing a silver salt photograph like image from the viewpoint of keeping the stability of dispersion since the diameter of the dispersed particle is large in former times. However, the size of the dispersed particle is made small recently accompanied with the development of the dispersion technology and the printing of the silver salt photograph like image can be realized by the use of the dispersion ink. In example, an organic pigment, an inorganic pigment and a colored fine particle are used as the colorant of the dispersion ink.

Recently, the precision of the ink-jet recording is raised and the printing aimed at an image with a high texture like as a silver salt photograph is often performed. A glossy recording medium such as the foregoing swelling type recording medium and porous recording medium is preferably used when the printing required to from an image with the high texture.

When the image is recorded by the dye ink, incompatibility is not felt so much at the boundary of the non image area and the image recorded area since the ink is wholly permeated into the ink absorption layer and the status of the surface after the image recording is almost the same as that before the recording. Contrary to that, when the dispersion ink is used for recording on the glossy type recording medium, almost of the colorant-particles cannot be permeated into the interior of the ink absorption layer and are exposed to the surface of the recording medium since there is no pore in the ink absorption layer of the swelling type recording medium and the diameter of the colorant is larger than that of the pore in the ink absorption layer of the porous type recording medium. As a result of that, a surface is newly formed by the dispersed colorant exposed on the surface of the recording medium at the image area recorded by the dispersion ink. Consequently, the smoothness of the surface is made different from that of the original surface according to the status of the colorant accumulation. The variation of the surface smoothness is appeared as a variation of the glossiness and the glossiness of the image area is different from that of the non-image area. The presence of the areas each different in the glossiness in one recording medium causes a strong incompatible feel and the observer feels that the uniformity of the recorded image is considerably different from that of the silver salt photograph. Particularly, in the case of the usual dispersion ink, the smoothness of the recorded image surface tends to be considerably become more rough that that of the original surface of the recording medium. Therefore, problems are caused such that the glossiness is lowered and the feeling of incompatibility of the image tends to be occurred.

A method in which a lamination treatment is applied after the image recording and a method in which the recorded image is pressed by a heating roller are known as the method for disappear the feeling of incompatibility. These methods have drawbacks such that a treatment accompanied with a trouble and a relatively large consumption of energy is necessary after the image formation and a material for lamination and an exclusive recording media are also necessary.

SUMMARY OF THE INVENTION

The object of the invention is to provide an ink-jet recording method and a recorded matter with no after treatment excellent in the glossiness feel, smoothness and texture.

The invention and the embodiment thereof are described.

An ink-jet recording method comprising the step of adhering a dispersion ink comprised of a colorant dispersed in a solvent onto recording medium having a fine particle and a water-soluble binder, wherein the relation between the center-line average surface roughness RaA in μm at the non-image area of the recording medium and the center-line average surface roughness RaB in μm at the image area of the recording medium is represented by Expression 1.

$$0.7 \leq RaB/RaA \leq 1.8 \qquad \text{Expression 1.}$$

The average difference of height between the non-image area and the surface of an individual dot is preferably not more than 2.0 μm.

The center-line average surface roughness RaA is preferably not more than 0.8 μm.

The average particle diameter of the colorant dispersed in the dispersion ink is preferably from 0.05 to 0.2 μm.

The dispersion ink preferably contains at least a colorant, a water-soluble organic solvent and water.

The recording medium is preferably a porous type recording medium containing a fine particle and a hydrophilic binder.

The colorant is preferably a pigment.

A recorded matter prepared by an ink-jet recording method by which a dispersion ink comprised of a colorant dispersed in a solvent is adhered on a recording medium containing a fine particle and a water-soluble binder, wherein the relation the center-line average surface roughness RaA in μm at the non-image area of the recording medium and the center-line average surface roughness RaB in μm at the image area of the recording medium is represented by Expression 1.

$$0.7 \leq RaB/RaA \leq 1.8 \qquad \text{Expression 1.}$$

DETAILED DESCRIPTION OF THE INVENTION

As a result of the investigation by the inventors as to the feel of glossiness and texture of the image output by the ink-jet, it has been found that the feel of unevenness caused by the difference of texture between the non-image area and the image area which tends to be occurred in the printed matter by the pigment ink, is considerably improved so as to obtain the smoothness feel and the texture as like as the silver salt photograph by controlling the relation of the center-line average roughness Ra at the non-image area and that at the image area to be within a specified range.

Although it has been tried, in the past, to coordinate the glossiness of the non-image area with that of the image area but the image area formed by the pigment ink has metallic glossiness and the difference of glossiness between the non-image area and the image area tends to be increased. However, the texture of the image area is considerably degraded and the feel of unevenness is rather increased when the glossiness of the non-image area and that of the image area is made near. It is found by the inventors that the ratio of the center-line average surface roughness Ra value of the non-image area to that of the image area correlates with the texture.

The invention is described in detail below. The relation between the center-line average surface roughness of the non-image area RaA, hereinafter referred to as RaA, and that of the image area RaB, hereinafter referred to as RaB is represented by Expression 1.

In the invention, the center-line average roughness Ra is defined by the following JIS Surface roughness B0601, and represented by the center-line average roughness measured under the conditions of the standard length of 5.0 mm and the cut-off value of 0.8 mm.

The center-line average roughness Ra is a value in μm calculated by the following formula in which L is a measuring length L of a part of the roughness curve cut out in the direction of the center-line of the roughness curve, X-axis is the center-line of the cut out part, Y-axis is the vertical magnification direction, and the roughness curve is represented by Y=f(X).

$$Ra = \frac{1}{L}\int_0^L |f(x)| dx$$

The measurement of the center-line average roughness Ra is carried out by the following procedures; the samples to be measured is stood so as to be not contacted with each other in an atmosphere of a temperature of 25° C. and a relative humidity of 65% and conditioned for 24 hours and then measured under the same conditions. The method for standing the samples so as to be not contacted with each other is, for example, that the ink-jet recording medium, the edges thereof are heightened, is winded up, that a paper sheet is inserted between each of the recording media and piled, and that the recording medium is fixed on a frame made of cardboard at the four corners thereof. Usable measuring apparatus is, for example, Surfcom 500B manufactured by TOKYO PRECISION INSTRUMENTS CO., LTD.

In the invention, the relation of the RaA at the non-image area of the recording medium and RaB at the image area is $0.7 \leq RaB/RaA \leq 1.8$, preferably $0.8 \leq RaB/RaA \leq 1.6$, and more preferably $0.9 \leq RaB/RaA \leq 1.4$.

In the past, the ratio of RaB at the image area to RaA at the non-image area B/A of the recording medium on which an image was recorded by the pigment ink is usually less than 0.7 or more than 1.8. When the ratio B/A is less than 0.7, reflection of metallic glossiness is occurred at the image recorded area and the considerable incompatibility is felt since the image area is stood out in relief against the non-image area. Besides, when the ratio B/A exceeds 1.8, the smoothness feel of the image recorded area is inferior compared with that of the non-image area and the continuity between the non-image area and the image area is not smooth. Accordingly, it is felt that the image area is selectively sunk and the image is gone away from the homogenous feel of the silver salt photograph.

In the invention, the image recorded area of the recording medium is an area at which an image of dispersion ink is formed on the recording medium. It is preferable that the relation represented by the Expression 1 is satisfied within the range of black density of from 0.5 to 1.0, more preferably from 0.8 to 1.2, from the viewpoint of enhancing the effects of the invention even though there is no limitation on the image density. When the image is a yellow, magenta or cyan image, it is preferable that the Expression 1 is satisfied within the range of the each image of from 0.1 to 2.0, more preferably from 0.5 to 1.5.

The Ra value of the image recorded area can be suited with the Ra value of the recording medium by controlling the structure of the colorant particles in the image recorded area. For controlling the structure of the colorant particles, for example, a suitable combination of the following means can be applied; the optimization of the kind or the using amount of the hydrophilic binder, the control of the solvent absorbing speed of the recording medium by controlling of the cross-linking degree of the binder, the optimization of the primary or secondary particle size of the colorant particle in the suspension ink, the control of the dynamic surface tension of the ink by optimizing the kind and the using amount of the surfactant and the water-soluble organic solvent, the optimization of the colorant concentration in the ink, the optimization of the kind and the using amount of the dispersant, and the technique for stabilizing the dispersed particles by optimizing the composition of the ink, even though there is no limitation on the concrete method for attaining the foregoing requirements.

In the invention, the average height difference h between the surface of the non-image area and that of the individual dot on the recording medium is preferably not more than 2.0, more preferably not more than 1.5 $\mu$m, further preferably from 0.1 to 1.0 $\mu$m.

In the invention, the average height difference h is defined, for example, by a method that the cross section of the non-image area of the recording medium and the maximum density portion of the image area are photographed by a scanning type electron microscope and the average height difference h is defined from the difference of the thickness of the layer measured on the photographs and the magnification, or that the height difference between the non-image area and the individual dot surface is defined by the use of a non-touching type three dimensional surface analyzing apparatus RST/PLUS, manufactured by WYKO Co., Ltd.

The dispersion ink relating to the invention is described below.

In the invention, the dispersion ink is an ink containing a fine solid colorant particle dispersed in a solvent by applying energy to the solid colorant particle. The aqueous dispersion ink is ink comprising water and a water-soluble organic solvent and at least a colorant dispersed in the solvent.

The colorant to be used in the invention is preferably a pigment. The pigment usable in the invention include a colored organic pigment and a colored inorganic pigment, for example, an organic pigment such as an azo pigment such as an azo lake, an insoluble azo pigment and a condensed azo pigment; a polycyclic pigment such as a phthalocyanine pigment, perylene and a perylene pigment, an anthraquinone pigment, a quinacridone pigment, a dioxazine pigment, a thioindigo pigment, an isoindolinone pigment and a quinophthalone pigment, a dye lake such as a basic dye lake and an acidic dye lake, a nitro pigment, a nitroso pigment, aniline black and a day-light fluorescent pigment, and an inorganic pigment such as carbon black.

Concrete examples of the organic pigment are described below.

Examples of magenta or red pigment include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 18:1, C.I. Pigment Red 48:1, C.I. Pigment Red 35:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178 and C.I. Pigment Red 122.

Examples of orange or yellow pigment include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 93, C.I. Pigment Yellow 94, C.I. Pigment Yellow 128 and C.I. Pigment Yellow 138.

Examples of green or cyan pigment include C.I. Pigment Blue 15, C.I. Pigment Blue 15:2, C.I. Pigment Blue 15:3, C.I. Pigment Blue 16, C.I. Pigment Blue 60 and C.I. Pigment Green 7.

As an example of the black pigment, carbon black is cited. Dispersing means such as a ball mill, a sand mill, an attrition mill, a roll mill, an agitator, a Henschel mixer, a colloid mill, a ultrasonic homogenizer, a pearl mill, a wet jet mill and a paint shaker and a suitable combination of them are usable in the invention. A method for classification of the particles using a centrifuge or a filter is preferably used in combination with the foregoing dispersion means.

The average diameter of the colorant particles dispersed in the dispersion ink is preferably from 0.05 to 0.2 $\mu$m, more preferable from 0.05 to 0.15 $\mu$m, further preferably from 0.05 to 0.10 $\mu$m. When the average diameter of the dispersed pigment particles exceeds 0.2$\mu$m, considerable degradation in the glossiness is occurred in the image formed on a glossy recording medium and considerable degradation in the glossiness in the image formed on a transparency recording medium. When the average diameter of the dispersed pigment particles is less than 0.05 $\mu$m, the stability of the pigment particles tend to be lowered and the degradation of storage stability of the ink is undesirably occurred.

The diameter of the dispersed pigment particle can be measured by a particle size measuring apparatus using a light scattering method, an electrophoresis method or a laser Doppler method, which are available on the market. The diameter also can be determined by a method in which at least 100 particles are photographed by a transmission electron microscope and the photographed image is subjected to a statistical treatment by an image analyzing soft ware such as Image-Pro, manufactured by Mediacybernestics Co., Ltd.

The dispersion ink is preferably aqueous ink which contains a water-soluble organic solvent and water additionally to the foregoing colorant or pigment.

Examples of the water-soluble organic solvent usable in the invention include an alcohol such as methanol, ethanol, propanol, iso-propanol, butanol, isobutanol, secondary butanol, tertiary butanol, pentanol, hexanol, cyclohexanol and benzyl alcohol; a polyvalent alcohol such as ethylene glycol, diethylene glycol, triethylene glycol, polyethylene glycol, propylene glycol, butylene glycol, hexane diol, pentane diol, glycerol, hexane triol and thiodiglycol; a polyvalent alcohol ether such as ethylene glycol monomethyl ether, ethylene glycol monoethyl ether, diethylene glycol monomethyl ether, diethylene glycol monoethyl ether, diethylene glycol dimethyl ether, ethylene glycol monomethyl ether acetate, triethylene glycol monomethyl ether, triethylene glycol monoethyl ether, triethylene glycol dimethyl ether and tripropylene glycol dimethyl ether; an amine such as ethanolamine, diethanolamine, triethanolamine, N-methyldiethanolamine, N-ethyl-diethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine; an amide such as formamide, N,N-dimethylformamide and N,N-dimethylacetamide; a heterocyclic compound such as 2-pyrrolidone, N-methyl-2-pyrrolidone, 2-oxazolidone and 1,3-dimethyl-2-imidazolidinone; a sulfoxide such as dimethylsulfoxide; a sulfone such as sulforane; a sulfonate such as sodium 1-butanesulfonate; urea, acetonitrile and acetone.

The following additives may be optionally used in the suspension ink relating to the invention additionally to the foregoing materials.

The ink may contain a surfactant for improving the dispersion stability of the pigment. Examples of the surfactant preferably used in the ink relating to the invention include an anionic surfactant such as a dialkylsulfosuccinate, an alkylnaphthalenesulfonate and a fatty acid salt; a nonionic surfactant such as a polyoxyethylene alkyl ether, polyoxyethylene alkyl aryl ether, an acetylene glycol and a polyoxyethylene-polyoxypropylene block copolymer; a cationic surfactant such as an alkylamine and a tertiary ammonium salt; and a polymer surfactant. Particularly, the anionic surfactant and the polymer surfactant are preferably used.

The following water-soluble resins are preferably used as the polymer surfactant in the invention from the viewpoint of the disgorging stability. Examples of the water-soluble resin preferably used include a styrene-acrylic acid-alkyl acrylate copolymer, a styrene-acrylic acid copolymer, a styrene-maleic acid-alkyl acrylate copolymer, a styrene-maleic acid copolymer, a styrene-methacrylic acid-alkyl acrylate copolymer, a styrene-methacrylic acid copolymer, a styrene-maleic acid half ester copolymer, a vinylnaphthalene-acrylic acid copolymer and a vinylnaphthalene-maleic acid copolymer.

The adding amount of the polymer surfactant to the whole amount of the dispersion ink is preferably from 0.1 to 10% by weight, more preferably from 0.3 to 5% by weight.

The polymer surfactant may be used in a combination of two or more thereof.

An electro conductivity controlling agent can be used in the invention, for example, an inorganic compound such as potassium chloride, ammonium chloride, sodium sulfate, sodium nitrate and sodium chloride and a water-soluble amine such as triethanolamine.

Other than the above-mentioned, an additive such as an antiseptic agent, an antimold agent and a viscosity controlling agent may be added to the ink relating to the invention.

The recording medium relating to the invention is described.

The recording medium is preferably a porous recording medium having a porous layer which contains a water-soluble binder and a fine particle.

The porous layer relating to the invention is mostly comprised of the fine particle and the water-soluble binder. An inorganic fine particle is preferably used since a high glossiness and a high color density can be obtained by the use of the inorganic fine particle and the inorganic fine particle is easily available even though both of the inorganic particle and an organic fine particle can be used in the invention. Examples of such the inorganic particle include a white inorganic pigment such as light calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaseous earth, calcium silicate, magnesium silicate, synthesized amorphous silica, colloidal silica, alumina, colloidal alumina, pseudoboehmite, aluminum hydroxide, lithopone, zeolite and magnesium hydroxide. The inorganic fine particle may be either used in a state of primary particle or a state of forming a secondary particle.

In the invention, alumina, pseudoboehmite, colloidal silica and silica fine particle synthesized by a gas phase method are preferred from the viewpoint of to obtain a high quality print by the ink-jet recording medium. The silica fine particle synthesized by a gas phase method is particularly preferred. The silica fine particle synthesized by a gas phase method may be one decorated by Al on the surface thereof. The Al content in the silica fine particle synthesized by a gas phase method decorated by Al on the surface is preferably from 0.05 to 5% by weight of the silica.

The diameter of the inorganic fine particle is preferably not more than 1 $\mu$m even though the particle with any diameter may be used. When the diameter is not more than 1 $\mu$m, the glossiness and color appearance are suitable and the diameter of not more than 0.2 $\mu$m is more preferable and the diameter of not more than 0.1 $\mu$m is most preferable. The lower limit of the particle diameter is not specified but the diameter of not less than about 0.003 $\mu$m, particularly not less than 0.005 $\mu$m, is preferable from the viewpoint of the production of the inorganic particle.

The average diameter of the inorganic particles is determined by measuring the optional 100 particles by observing the cross section or the surface of the porous layer by an electron microscope and calculating the simple average or number average of the particle diameter. The diameter is defined by the diameter of the assumed circle having the same area as the projection area of the particle.

The dispersion degree of the fine particles is preferable not more than 0.5 from the viewpoint of the glossiness and the color formation. When the dispersion degree is not more than 0.5, suitable glossiness and a good color is formed on the printed matter. The dispersion degree of not more than 0.3 is particularly preferred. The dispersion degree of the fine particles is defined by the quotient of the standard deviation of the particle diameter by the average diameter, the standard deviation of the particle diameter is obtained by observing the fine particles in the porous layer by the electron microscope in the same manner as in the determined of the average diameter.

The diameter of the foregoing average diameter is that of the particle in an individual form observed by the electron microscope in the porous layer, even though the fine particles may exist in the porous layer either in a form of the primary, secondary or higher degree coagulated particle.

The content of the fine particles in the aqueous coating liquid is from 5 to 40%, preferably from 7 to 30%, by weight.

The hydrophilic binder to be contained in the porous layer, for example, gelatin, poly(vinyl pyrrolidone), poly (ethylene oxide), polyacrylamide and poly(vinyl alcohol) are usable, and poly(vinyl alcohol) is particularly preferred.

Poly(vinyl alcohol) has particularly a high suspending ability to the inorganic particle since which has an interaction with the inorganic particle. Moreover, poly(vinyl alcohol) is excellent in the resistively to clacking at the coating and drying of the porous layer since the shrinking stress at the coating and drying is relatively small. Examples of the poly(vinyl alcohol) include a modified poly(vinyl alcohol) such as a poly(vinyl alcohol) cationically modified at the terminal thereof and an anionically modified poly (vinyl alcohol) having an anionic group, additionally to an ordinary poly(vinyl alcohol) produced by hydrolysis of poly(vinyl acetate).

A polyvinyl alcohol prepared by hydrolysis of poly(vinyl acetate) having an average polymerization degree of not less than 3000, particularly from 1,000 to 5,000, is preferably used. One having a saponification degree of from 70 to 100%, particularly from 80 to 99.5% is preferred.

The cationically modified poly(vinyl alcohol) include one having a primary, secondary or tertiary amino group or a quaternary ammonium group on the main chain or branched chain thereof, for example, those described in Japanese Patent Publication to Open Public Inspection No. 61-10483. Such the compound can be obtained by saponification of a copolymer of an ethylenic unsaturated monomer having a cationic group and vinyl acetate.

Examples of the ethylenic unsaturated monomer having a cationic group include trimethyl-(2-acrylamide-2,2- dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxyethyl trimethylammonium chloride, trimethyl-(methacrylamidopropyl)ammonium chloride and N-(1,1-dimethyl-3-dimethylaminopropyl)acrylamide.

The ratio of the monomer containing the cationic modifying group to vinyl acetate is from 0.1 to 10 mole-% preferably from 0.2 to 5 mole-%.

Tow or more kinds of poly(vinyl alcohol) different in the polymerization degree or the kind of the modification from each other may be used in combination. When a polyvinyl alcohol having a polymerization degree of 2,000 or more is used, it is preferable that a poly(vinyl alcohol) having a polymerization degree of not more than 1,000 is previously added to a suspension of the inorganic fine particles in a ratio of from 0.05 to 10%, preferably from 0.1 to 5%, by weight and then a poly(vinyl alcohol) having a polymerization degree of not less than 2,000 since considerable increasing of the viscosity is not occurred by such the procedure.

The ratio of the fine particles to the hydrophilic binder in the porous layer is preferably fro 2 to 20 times by weight. When the ratio is less than 2 times, not only the space ratio in the porous layer is lowered so that a sufficient space volume cannot be obtained but also the space is closed by the excessive binder swelled at the time of ink-jet recording so that the ink absorbing speed is lowered. Besides, when the ratio exceeds 20 times, clacks tend to be undesirably occurred when a thick porous layer is coated. The ratio of the fine particles to the hydrophilic binder is particularly preferably from 2.5 to 12 times, most preferably from 3 to 10 times.

It is preferable for obtaining a higher quality print that a non-water-permeable support is used as support of the ink-jet recording medium, even though a water-permeable support such as paper may be used.

Not only a high quality image cannot be obtained by the water-permeable supports but the effects of an additives are also disturbed since the over coated additives are diffused into the support after coating.

Examples of the preferable support include a polyester resin film, a cellulose diacetate film, a cellulose triacetate film, a polyolefin resin film, an acryl resin film, a polycarbonate resin film, a poly(vinyl chloride) film, a polyimide film, a transparent or an opaque film composed of cellophane or celluloid, and a resin coated paper, so called as PC paper, composed of a paper sheet coated on the both sides thereof by a resin layer.

Various kinds of additives may be added to the aqueous coating liquid to form the porous layer. Examples of such the additive include a cationic mordant, a cross-linking agent, a cationic, anionic, nonionic and amphoteric surfactant, a whiteness controlling agent, a fluorescent whitening agent, an anti-mould agent, a viscosity control agent, a low-boiling organic solvent, a high-boiling organic solvent, a latex emulsion, an anti-fading agent, a UV absorbent, a water-soluble or water-insoluble polyvalent metal compound, a matting agent and a silicone oil. Among them, the cationic mordant is preferred for improving the water-proof and moisture-proof ability after the printing.

A polymer mordant having a primary, secondary or tertiary amino group or a quaternary ammonium group may be used, and the polymer mordant having the quaternary ammonium group is preferred since the change of color and the degradation of the light-fading resistivity are inhibited.

The preferable polymer mordant is obtained as a homopolymer of the monomer having the quaternary ammonium group or a copolymer or a condensed polymer of such the monomer with another monomer.

It is particularly preferred to add a cross-linking agent of the hydrophilic binder. The water-proof ability of the porous layer is improved by the cross-linking agent and the ink absorbing speed is raised since the swelling of the hydrophilic binder at the time of ink-jet recording is inhibited. An inorganic cross-linking agent such as a chromium compound, an aluminum compound, a zirconium compound and a boric acid compound and an organic cross-linking agent such as an epoxy cross-linking agent, an isocyanate cross-linking agent, an aldehyde cross-linking agent, an N-methylol cross-linking agent, an acryloyl cross-linking agent, a vinylsulfon cross-linking agent, a reactive halogen cross-linking agent, a carbodiimide cross-linking agent and an ethyleneimino cross-linking agent are usable as the cross-linking agent.

The amount of the cross-linking agent is about from 1 to 50%, preferably from 2 to 40%, by weight of the hydrophilic binder.

The inorganic cross-linking agent such as the boric acid and the zirconium compound and the epoxy cross-linking agent are particularly preferred when the hydrophilic binder is the poly(vinyl alcohol) and the fine particle is silica.

The coating in the preparation of the recording medium relating to the invention can be performed by a method optionally selected from the followings: a gravure coating method, a roller coating method, an air-knife coating method, a spray coating method, an extrusion coating method, a curtain coating method and an extrusion coating method using a hopper described in U.S. Pat. No. 2,681,294.

The porous layer relating to the recording medium in the invention either may be composed of a single layer or plural layers. When the layer is composed of plural layers, it is preferable that the whole layers are coated at once for reducing the production cost.

The ink-jet head to be used in the ink-jet recording method of the invention may be either an on-demand type or a continuous type. Any disgorge method may be used even though the followings are cited as concrete examples: an electro-mechanical conversion method such as a single cavity type, a double cavity type, a bender type, a piston type, a share mode type and a shared wall type, an electro-thermal conversion method such as a thermal ink-jet type and a bubble-jet type, a static attraction method such as an electric field control type and a slit jet type, and a discharge method such as a spark jet type.

EXAMPLES

The invention is described referring examples. In the examples, "percent" represent percent by weight as long as no specific description is added.

Example 1

<Preparation of Recording Medium>
(Preparation of Recording Medium 1)
(Preparation of Silica Dispersions D1 and D2)

To 110 liters of an aqueous solution C1 containing 12% of cationic polymer P1, 10% of n-propanol, 2% of ethanol, 2 g of anti-foaming agent SN381, manufactured by SAN NOPCO LIMITED, and having a pH of 2.5, 400 liters of silica dispersion B1 containing 25% of silica A200 prepared by a gas phase method, manufactured by Nihon Aerosil Kogyo Co., Ltd., the particles of which are previously uniformly dispersed and the average diameter thereof was 0.012 μm, 0.3% of a water-soluble fluorescent whitening agent UVITEXNFW Liquid, manufactured by Ciba Specialty Chemicals Co., Ltd., and 1% of ethanol and having a pH of 2.5 was added while stirring with a speed of 3,000 r.p.m. at an ordinary temperature. Then 45 liters of an aqueous solution A1 containing a mixture of boric acid and borax in a weight ratio of 1:1 and an each concentration of 3% was gradually added.

Thereafter, the mixture was subjected to a dispersing treatment by a high pressure homogenizer, manufactured by Sanwa Kogyo Co., Ltd., with a pressure of 3,000 N/cm$^2$ and made up to 360 liters by purified water. Thus almost transparent Silica Dispersion D1 was prepared.

Besides, 400 liters of the silica dispersion liquid B1 was added while stirring with a speed of 3,000 r.p.m. to 120 liters an aqueous solution C2 containing 12% of cationic polymer P-2, 10% of n-propanol, and 2% of ethanol and having a pH of 2.5, and then 52 liters of the aqueous solution A1 was gradually added while stirring.

Thereafter, the mixture was subjected to a dispersing treatment by a high pressure homogenizer, manufactured by Sanwa Kogyo Co., Ltd., with a pressure of 3,000 N/cm$^2$ and made up to 360 liters by purified water. Thus almost transparent Silica Dispersion D2 was prepared.

Silica Dispersion Liquids D1 and D2 were each filtered by TCP-30 type filter, manufactured by Advantec-Toyo Co., Ltd., having a filtering precision of 30 μm.

(Preparation of Oil Dispersion Liquid)

In 45 kg of ethyl acetate, 20 kg of diisodecyl phthalate and 20 kg of an anti-oxidant AO-1 were dissolved with heating. The solution was mixed at 55° C. with 210 liters of a gelatin solution containing 8 kg of acid process gelatin, 2.9 kg of cationic polymer P-1 and 10.5 kg of saponin. The mixture was emulsified by the high pressure homogenizer and made up to 300 liters in the total volume by purified water. Thus Oil Dispersion Liquid was prepared.

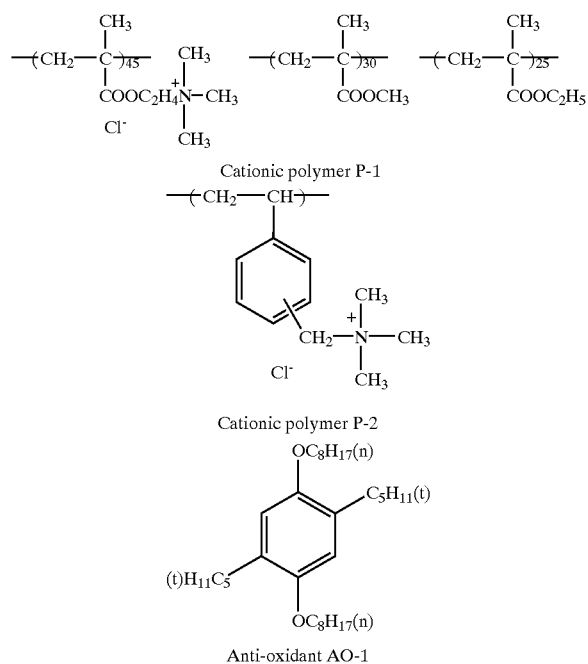

Cationic polymer P-1

Cationic polymer P-2

Anti-oxidant AO-1

(Preparation of Coating Liquid)

A coating liquid was prepared by successively mixing the foregoing dispersion liquids and additives. The amount of each of the components is described in the amount per liter of the coating liquid.

Coating liquid of the first layer: the lowermost layer
    Silica Dispersion D1 580 ml
    Poly(vinyl alcohol) PVA 203 (Kraray Co., Ltd.) 10% solution 5 ml
    Poly(vinyl alcohol) having an average polymerization degree of 3,800 and a saponification degree of 88% 6.5% solution 290 ml
    Oil Dispersion 30 ml
    Latex dispersion liquid AE803 (Showa Highpolymer Co., Ltd.) 42 ml
    Ethanol 8.5 ml
Make up to 1,000 ml by purified water Coating liquid of the second layer
    Silica Dispersion D1 600 ml
    Poly(vinyl alcohol) PVA 203 (Kraray Co., Ltd.) 10% solution 5 ml
    Poly(vinyl alcohol) having an average polymerization degree of 3,800 and a saponification degree of 88% 6.5% solution 270 ml
    Oil Dispersion 20 ml
    Latex dispersion liquid AE803 (Showa Highpolymer Co., Ltd.) 22 ml
    Ethanol 8 ml
Make up to 1,000 ml by purified water Coating liquid of the third layer
    Silica Dispersion D2 630 ml
    Poly(vinyl alcohol) PVA 203 (Kraray Co., Ltd.) 10% solution 5 ml
    Poly(vinyl alcohol) having an average polymerization degree of 3,800 and a saponification degree of 88% 6.5% solution 270 ml
    Oil Dispersion 10 ml
    Latex dispersion liquid AE803 (Showa Highpolymer Co., Ltd.) 5 ml
    Ethanol 3 ml
Make up to 1,000 ml by purified water Coating liquid of the fourth layer: the uppermost layer
    Silica Dispersion D2 660 ml
    Poly(vinyl alcohol) PVA 203 (Kraray Co., Ltd.) 10% solution 5 ml
    Poly(vinyl alcohol) having an average polymerization degree of 3,800 and a saponification degree of 88% 6.5% solution 250 ml
    Betaine type surfactant 1, 4% solution 3 ml
    Saponin, 25% solution 2 ml
    Ethanol 3 ml
Make up to 1,000 ml by purified water Betaine Type Surfactant 1

Each of the coating liquids prepared as above was filtered by TCPD-30 filter having a filtering precision of 20 μm and then further filtered by TCPD-10 filter.

(Coating of Recording Medium)

The four coating liquids were simultaneously coated by a slide hopper type coater at 40° C. on a paper support coated with polyethylene layer on both sides thereof so that the wet thickness of each of the years were as follows.
<Wet Thickness of the Layer>

The first layer: 42 µm

The second layer: 39 µm

The third layer: 44 µm

The fourth layer: 38 µm

The following paper support was used, which had a width of 1.5 m and a length of 4,000 m and was winded up as a roll.

The paper support used in the above was composed of a photographic raw paper having a moisture content of 8% and a weight of 170 g and the surface of which was coated with a polyethylene layer containing anatase type titanium oxide in an amount of 6% and having a thickness of 35 µm by a melt-extrusion method and the backside of which was coated with a polyethylene layer having a thickness of 40 µm by the melt-extrusion method. The surface side was subjected to corona discharge treatment and coated with a subbing layer of 0.05 g per square meter of poly(vinyl alcohol), and the backside was subjected to the corona discharge treatment and was coated with a backing layer containing about 0.4 g of a styrene-acrylate latex binder having a Tg of about 80° C., 0.1 g of anti-static agent (a cationic polymer) and 0.1 g of silica having a diameter of 2 µm as a matting agent.

The layer formed by coating the ink absorbing coating liquids was cooled by a layer surface temperature of 13° C. by passing for 15 seconds through a cooling zone held at 5° C., and dried trough plural drying zones each controlled at a suitable temperature, and then wined up into a form of roll. Thus comparative Recording Medium 1 was prepared. The center-line average roughness RaA value of Recording Medium 1 was 0.21 µm according to the result measured by the later-mentioned method.

Preparation of Recording Medium 2

Recording Medium 2 having a RaA value of 0.46 µm was prepared in the same manner as in recording medium 1 except that the inorganic fine particle, silica dispersion D1 or D2, and the hydrophilic binder in each layer were suitably changed.

<Preparation of Ink>

Preparation of Pigment Ink 1

Pigment Ink 1 comprising a yellow pigment was prepared in the following manner.

Preparation of Yellow Pigment Dispersion 1

C.I. Pigment Yellow 128 (Chromophtal Yellow 8G-CF manufactured by Ciba Specialty Chemicals Co., Ltd.) 100 g Glycerol 100 g Ion exchanged water 130 g The above-mentioned components were mixed and dispersed by a lateral beads mill System Zeta Mini, manufactured by Ashizawa Co., Ltd., in which zirconia beads were charged in a volume ratio of 60%. The dispersion was subjected to centrifugal treatment. Thus Yellow Pigment Dispersion 1 having an average diameter of 95 nm was prepared. The diameter was measured by Zetasizer 1000, manufacture by Malvern Co., Ltd.

(Preparation of Ink)

Yellow Pigment Dispersion 1 (average diameter: 95 µm) 160 g

Diethylene glycol 180 g

Glycerol 80 g

Pelex OT-P (Kao Co., Ltd.) 5 g

Proxel (Zeneca Co., Ltd.) 2 g

The above components were made up to 1,000 g by ion-exchanged water and filtered twice by a 1 µm Millipore filter to prepare a yellow pigment ink or Pigment Ink 1.

(Preparation of Pigment Inks 2 through 12)

Pigment Inks 2 through 12 were prepared in the same manner as in Pigment Ink 1 except that C.I. Pigment Yellow 128 was replaced by each of the pigments described in Table 1 and the dispersing condition was controlled so that the average diameter was become to that described in Table 1.

<Preparation of Samples for Evaluation>

(Preparation of Image Recorded Samples 1 through 12 for Evaluation)

Image Recorded Samples 1 through 12 for evaluations were prepared in the following manner using the foregoing Pigment Inks 1 through 12 and Recording Medium 1.

An on-demand type ink-jet printer was used for printing images which had a piezo type head with nozzle diameter of 20 µm, a driving frequency of 12 kHz, a nozzle number for each color of 128, a density of nozzle for the same color of 180 dpi and the maximum recording density of 720×720 dpi. A solid monochromatic pattern having a reflective density of 1.0 and a monochromatic pattern composed of dots in which each of-the dots was individually scattered from each other were output on each of the recording media at to each of the colors. The dpi is the number of dot per inch or 2.54 cm.

Measurement of the center-line average roughness Ra at the non-image area and the image area.

The center-line average roughness Ra values at the non-image area and the image area of the output image having the reflective density of 1.0 were measured by the following procedure.

The center-line average roughness values were measured at 64 points in each of the non-image area and the image area by SURFCOM 500B, manufactured by TOKYO PRECISION INSTRUMENTS CO., LTD., and the center-line average roughness of the non-image area and the image area were each referred to as RaA and RaB, respectively.

The measurement was carried out on the sample having a size of 40 cm×40 cm. The sample was divided into 64 squares and the roughness was measured at the center of each of the squares under the conditions of a measuring length of 5 mm and a cut-off value of 0.8 mm. The Ra is defined according to Surface Roughness of JIS B0601.

(Measurement of the Average Height Difference between the Surface of Non-image Area and the Individual Dot Surface)

The average height difference h between the surface of non-image area and the individual dot surface was measured by the following procedure using the output monochromatic pattern in which the individually scattered dots were recorded.

The height difference h was measured by a non-contact type three dimensional surface analyzing apparatus RST/PLUS, manufactured by WYKO co., Ltd. The apparatus was set so that the whole dot was included in the measuring are of 312×231.7 µm and the height difference was measured regarding 50 dots of each of the colors. The arithmetic average of the measured values was defined as the height difference h.

(Evaluation of Glossiness Feel)

The glossiness feel of the image area and that of the non-image area were visually evaluated according to the following norm.

A: The image area has a considerable glossiness feel and the difference between the glossiness feel of the non-image area is not felt at all.

B: The image area has a glossiness feel and the difference between the glossiness feel of the non-image area is not felt.

C: The image area has a little glossiness feel and the difference between the glossiness feel of the non-image area is felt a little.

D: The image area has no considerable glossiness feel and the difference between the glossiness feel of the non-image area is considerable.

(Evaluation of the Smoothness Feel)

The smoothness feel of the image area and that of the non-image area were visually evaluated according to the following norm.

A: The image area is excellent in the smoothness feel and the difference between the smoothness feel of the non-image area is not felt at all.

B: The image area is good in the smoothness feel and the difference between the smoothness feel of the non-image area is not felt.

C: The image area is inferior a little in the smoothness feel and the difference between the smoothness feel of the non-image area is felt a little.

D: The image area has no smoothness feel and the difference between the smoothness feel of the non-image area is considerable.

(Preparation of Image Recorded Samples 13 through 24)

Image Recorded Samples 13 through 20 were prepared using Pigment Inks 1 through 8 in the same manner as in the image recorded samples 1 through 8 except that Image Recording Medium 1 was replaced by Image Recording Medium 2. Moreover, Image Recorded Samples 21 through 24 were prepared on Image Recording Medium 2 in the same manner as in the above-mentioned except that Pigment Inks 13 through 16 were used which were the same as pigment Inks 9 through 12, respectively, except that each of their average particle diameter was varied as described in Table 2. These samples were subjected to the evaluations of the center-line average surface roughness Ra, the average height difference between the non-image area and the image surface, the glossiness feel and the smoothness feel.

Results obtained by the above evaluations are shown in Table 1 and 2.

TABLE 1

| Image recorded sample No. | Pigment ink No. | Kind of pigment | *1 | *2 | *3 | *4 | Average height difference h (μm) | Glossiness feel rank | Smoothness feel rank | Remarks |
|---|---|---|---|---|---|---|---|---|---|---|
| 1 | 1 | Pigment Yellow 128 | 95 | 0.21 | 0.25 | 1.19 | 0.55 | A | A | Inventive |
| 2 | 2 | Pigment Yellow 74 | 120 | 0.21 | 0.35 | 1.67 | 2.13 | B | B | Inventive |
| 3 | 3 | Pigment Red 122 | 98 | 0.21 | 0.23 | 1.10 | 0.42 | A | A | Inventive |
| 4 | 4 | Pigment Red 122 | 118 | 0.21 | 0.32 | 1.52 | 0.55 | B | A | Inventive |
| 5 | 5 | Pigment Blue 15:3 | 78 | 0.21 | 0.24 | 1.14 | 0.45 | A | A | Inventive |
| 6 | 6 | Pigment Blue 15:3 | 105 | 0.21 | 0.31 | 1.48 | 0.58 | A | A | Inventive |
| 7 | 7 | Pigment Black 7 | 95 | 0.21 | 0.26 | 1.24 | 1.05 | A | A | Inventive |
| 8 | 8 | Pigment Black 7 | 105 | 0.21 | 0.34 | 1.62 | 2.20 | A | B | Inventive |
| 9 | 9 | Pigment Yellow 74 | 180 | 0.21 | 0.62 | 2.95 | 2.23 | D | D | Comparative |
| 10 | 10 | Pigment Red 122 | 165 | 0.21 | 0.54 | 2.57 | 2.15 | D | D | Comparative |
| 11 | 11 | Pigment Blue 15:3 | 170 | 0.21 | 0.40 | 1.90 | 1.62 | C | D | Comparative |
| 12 | 12 | Pigment Black 7 | 150 | 0.21 | 0.58 | 2.76 | 2.58 | D | D | Comparative |

*1: Average diameter of pigment dispersion
*2: RaA of recording medium (μm)
*3: RaB of image area (μm)
*4: RaB/RaA

TABLE 2

| Image recorded sample No. | Pigment ink No. | Kind of pigment | *1 | *2 | *3 | *4 | Average height difference h (μm) | Glossiness feel rank | Smoothness feel rank | Remarks |
|---|---|---|---|---|---|---|---|---|---|---|
| 13 | 1 | Pigment Yellow 128 | 95 | 0.46 | 0.45 | 0.98 | 0.48 | A | A | Inventive |
| 14 | 2 | Pigment Yellow 74 | 120 | 0.46 | 0.58 | 1.26 | 1.98 | B | B | Inventive |
| 15 | 3 | Pigment Red 122 | 98 | 0.46 | 0.35 | 0.76 | 0.40 | A | A | Inventive |
| 16 | 4 | Pigment Red 122 | 118 | 0.46 | 0.48 | 1.04 | 0.58 | B | A | Inventive |
| 17 | 5 | Pigment Blue 15:3 | 78 | 0.46 | 0.38 | 0.83 | 0.42 | A | A | Inventive |
| 18 | 6 | Pigment Blue 15:3 | 105 | 0.46 | 0.50 | 1.09 | 0.50 | A | A | Inventive |

TABLE 2-continued

| Image recorded sample No. | Pigment ink No. | Kind of pigment | *1 | *2 | *3 | *4 | Average height difference h (μm) | Glossiness feel rank | Smoothness feel rank | Remarks |
|---|---|---|---|---|---|---|---|---|---|---|
| 19 | 7 | Pigment Black 7 | 95 | 0.46 | 0.39 | 0.85 | 0.98 | A | A | Inventive |
| 20 | 8 | Pigment Black 7 | 105 | 0.46 | 0.49 | 1.07 | 2.10 | A | B | Inventive |
| 21 | 13 | Pigment Yellow 74 | 80 | 0.46 | 0.30 | 0.65 | 2.18 | D | C | Comparative |
| 22 | 14 | Pigment Red 122 | 65 | 0.46 | 0.29 | 0.63 | 2.20 | D | C | Comparative |
| 23 | 15 | Pigment Blue 15:3 | 55 | 0.46 | 0.26 | 0.57 | 1.58 | D | C | Comparative |
| 24 | 16 | Pigment Black 7 | 68 | 0.46 | 0.26 | 0.57 | 2.34 | D | C | Comparative |

*1: Average diameter of pigment dispersion
*2: RaA of recording medium (μm)
*3: RaB of image area (μm)
*4: RaB/RaA As is shown in the results in Tables 1 and 2, the samples according to the invention having the ratio of the RaB value of the image area to the RaA value of the non-image area within the range of from 0.7 to 1.8 are superior to the comparative samples in the glossiness feel and the smoothness feel. Moreover, it can be confirmed that such the effects is enhanced by making the average height difference between the non-image area and the surface of the image area to not more than 2.0 μm.

Example 2

Image Recorded Samples 25 through 29 were prepared by recording the images according to the following procedure using Pigment Inks 1 through 16 and Recording Media 1 and 2 in the combination described in Table 3.
(Image Recording Method)
An on-demand type ink-jet printer was used for printing images, which had a piezo type head with nozzle diameter of 20 μm, a driving frequency of 12 kHz, a nozzle number for each color of 128, a density of nozzle for the same color of 180 dpi and the maximum recording density of 720×720 dpi. Solid monocolor patterns of each of the colors, yellow, magenta, cyan and black, each having a reflective density of 1.0 and an image according to the high precision color digital standard image data "N5·Bisycle" published by Zaidanhojin Nihon Kikaku Kyokai were output.
(Evaluation of the Properties of the Formed Image)
(Measurement of the Center-line Average Roughness Ra of the Non-image Area and that of the Image Area)
The measurement was performed in the same manner as in Example 1 as to each of the monocolor patterns.

Measurement of the Average Height Difference between the Non-image Area and the Surface of the Image Area
The measurement was performed in the same manner as in Example 1 as to each of the monocolor patterns.
Evaluation of the Glossiness Feel and the Smoothness Feel
The evaluation was performed in the same manner and the norm in Example 1.
(Evaluation of the Texture)
The image of the high precision color digital standard image data "N5·Bicycle" output by the foregoing procedure was visually evaluated by optionally selected 10 panelist according to the following norm. The observing distance and the illuminance for the evaluation were each from 300 to 400 mm and 1,000±50 Lux, respectively.
5: The output image has the texture, depth and high class feel and the image quality of it is almost the same as usual photograph.
4: The output image has the texture, depth and high class feel and the image quality of it is near usual photograph.
3: The output image is insufficient a little in the texture, depth and high class feel and the image quality is slightly inferior to that of usual photograph.
2: The output image is insufficient in the texture, depth and high class feel and the image quality is inferior to that of the photograph.
1: The texture, depth and high class feel are lacked at all in the output image and the image quality is widely different from that of usual photograph.
The evaluation result is represented by the average of the evaluation points of each panelist.
Thus obtained results are shown in table 3.

TABLE 3

| Output image No. | Recording media No. | RaA | Kind of ink | Ink No. | *1 | *2 | Average height difference h (μm) | Glossiness feel rank | Smoothness feel rank | Texture rank | Remarks |
|---|---|---|---|---|---|---|---|---|---|---|---|
| 25 | 1 | 0.21 | Yellow | 1 | 0.25 | 1.19 | 0.55 | A | A | 4.6 | Inventive |
|  |  |  | Magenta | 3 | 0.23 | 1.10 | 0.42 |  |  |  |  |
|  |  |  | Cyan | 5 | 0.24 | 1.14 | 0.45 |  |  |  |  |
|  |  |  | Black | 7 | 0.26 | 1.24 | 1.05 |  |  |  |  |

TABLE 3-continued

| Output image No. | Recording media No. | RaA | Kind of ink | Ink No. | *1 | *2 | Average height difference h (µm) | Glossiness feel rank | Smoothness feel rank | Texture rank | Remarks |
|---|---|---|---|---|---|---|---|---|---|---|---|
| 26 | 1 | 0.21 | Yellow | 2 | 0.35 | 1.67 | 2.13 | B | B | 3.8 | Inventive |
|  |  |  | Magenta | 4 | 0.32 | 1.52 | 0.55 |  |  |  |  |
|  |  |  | Cyan | 6 | 0.31 | 1.48 | 0.58 |  |  |  |  |
|  |  |  | Black | 8 | 0.34 | 1.62 | 2.20 |  |  |  |  |
| 27 | 2 | 0.46 | Yellow | 1 | 0.45 | 0.98 | 0.48 | A | A | 4.3 | Comparative |
|  |  |  | Magenta | 3 | 0.35 | 0.76 | 0.40 |  |  |  |  |
|  |  |  | Cyan | 5 | 0.38 | 0.83 | 0.42 |  |  |  |  |
|  |  |  | Black | 7 | 0.39 | 0.85 | 0.98 |  |  |  |  |
| 28 | 1 | 0.21 | Yellow | 9 | 0.62 | 2.95 | 2.23 | D | D | 1.2 | Comparative |
|  |  |  | Magenta | 10 | 0.54 | 2.57 | 2.15 |  |  |  |  |
|  |  |  | Cyan | 11 | 0.40 | 1.90 | 1.62 |  |  |  |  |
|  |  |  | Black | 12 | 0.58 | 2.76 | 2.58 |  |  |  |  |
| 29 | 2 | 0.46 | Yellow | 13 | 0.30 | 0.65 | 2.18 | D | C | 1.6 | Comparative |
|  |  |  | Magenta | 14 | 0.29 | 0.63 | 2.20 |  |  |  |  |
|  |  |  | Cyan | 15 | 0.26 | 0.57 | 1.58 |  |  |  |  |
|  |  |  | Black | 16 | 0.26 | 0.57 | 2.34 |  |  |  |  |

*1: RaB value of the image area
*2: RaB/RaA

As is appeared in Table 3, the samples according to the invention having the ratio of the RaB value of the image area to the RaA value of the non-area image within the range of from 0.7 to 1.8 are superior to the comparative samples in the glossiness feel and the smoothness feel and texture.

The ink-jet recording method and the recorded matter excellent in the glossiness feel, smoothness feel and texture can be provided by the invention.

What is claimed is:

1. An ink-jet recording method comprising the step of adhering a dispersion ink comprised of a colorant dispersed in a solvent onto recording medium having a fine particle and a water-soluble binder, wherein relation between center-line average surface roughness RaA in µm at non-image area of the recording medium and center-line average surface roughness RaB in µm at image area of the recording medium is represented by Expression 1:

$$0.7 \leq RaB/RaA \leq 1.8 \qquad \text{Expression 1.}$$

2. The ink-jet recording method of claim 1 wherein average difference of height between the non-image area and the surface of an individual dot is not more than 2.0 µm.

3. The ink-jet recording method of claim 1 wherein center-line average surface roughness RaA is not more than 0.8 µm.

4. The ink-jet recording method of claim 1 wherein an average particle diameter of the colorant dispersed in the dispersion ink is from 0.05 to 0.2 µm.

5. The ink-jet recording method of claim 1 wherein the dispersion ink contains at least a colorant, a water-soluble organic solvent and water.

6. The ink-jet recording method of claim 1 wherein the recording medium is a porous type recording medium containing a fine particle and a hydrophilic binder.

7. The ink-jet recording method of claim 1 wherein the colorant is a pigment.

8. A recorded matter prepared by an ink-jet recording method by which a dispersion ink comprised of a colorant dispersed in a solvent is adhered on a recording medium containing a fine particle and a water-soluble binder, wherein the relation the center-line average surface roughness RaA in µm at the non-image area of the recording medium and the center-line average surface roughness RaB in µm at the image area of the recording medium is represented by Expression 1:

$$0.7 \leq RaB/RaA \leq 1.8 \qquad \text{Expression 1.}$$

9. The recorded matter of claim 8 wherein average difference of height between the non-image area and the surface of an individual dot is not more than 2.0 µm.

10. The recorded matter of claim 8 wherein center-line average surface roughness RaA is not more than 0.8 µm.

11. The recorded matter of claim 8 wherein an average particle diameter of the colorant dispersed in the dispersion ink is from 0.05 to 0.2 µm.

12. The recorded matter of claim 8 wherein the dispersion ink contains at least a colorant, a water-soluble organic solvent and water.

13. The recorded matter of claim 8 wherein the recording medium is a porous type recording medium containing a fine particle and a hydrophilic binder.

14. The recorded matter of claim 8 wherein the colorant is a pigment.

* * * * *